Figure 1:
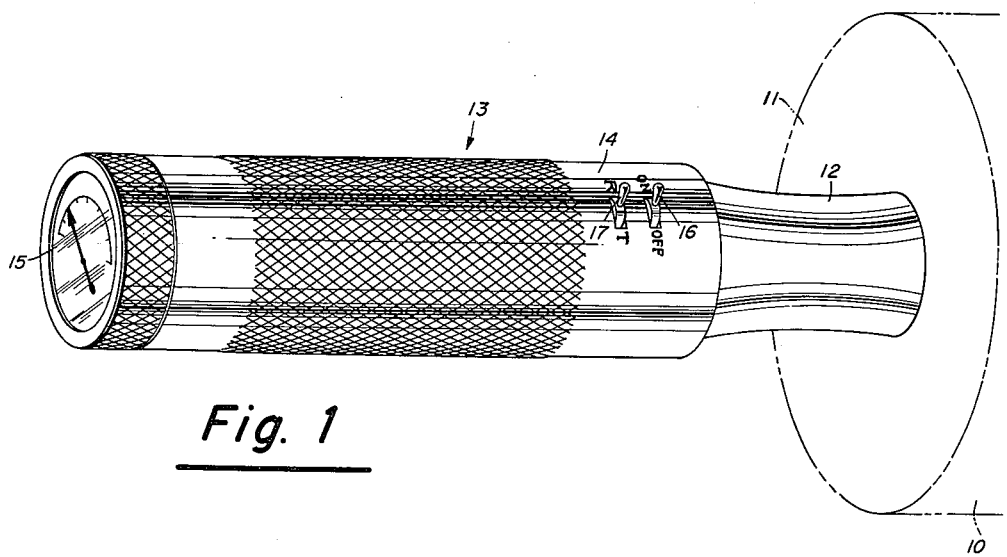

Feb. 26, 1963   H. R. BEITSCHER ETAL   3,079,583
SONAR CALIBRATOR
Filed Aug. 31, 1959

INVENTORS
HERBERT R. BEITSCHER
GEORGE A. COATES
ROYAL H. AKIN

BY

ATTORNEYS 3,079,583
SONAR CALIBRATOR
Herbert R. Beitscher, George A. Coates, and Royal H. Akin, San Diego, Calif., assignors to the United States of America as represented by the Secretary of the Navy
Filed Aug. 31, 1959, Ser. No. 837,303
12 Claims. (Cl. 340—5)
(Granted under Title 35, U.S. Code (1952), sec. 266)

The invention described herein may be manufactured and used by or for the Government of the United States of America for governmental purposes without the payment of any royalties thereon or therefor.

The present invention relates generally to echo-ranging calibration equipment and in particular to a sonar calibration instrument having means for measuring the transmission and reception effectiveness thereof within subaqueous or atmospheric mediums.

Ordinarily, in order to calibrate sonar equipment actually in service, it has been found to be desirable and often necessary to remove all of the components thereof from the carrier vehicle due to the fact that the calibration equipment is not portable and also due to the fact that the type of power required to run such calibration equipment may not be available at or on the carrier vehicle. So doing obviously requires a considerable number of man-hours and, in addition, usually ties up the carrier vehicle, decreasing the usefulness thereof. Moreover, in many instances, the various and sundry components of the sonar system may only be calibrated individually because of the lack of means for making bench test calibrations of said components in concert in an environment which is foreign to its service operation. This leaves a great deal to be desired as far as accuracy is concerned, since the operation as a unitary system is not fully known, even though the operation of the individual components making up such system is satisfactory as determined by individual bench test calibration procedures.

This invention overcomes many of the aforementioned difficulties encountered in using prior art devices and procedures in that it is portable and carries its own power supply, allowing calibration of sonar equipment to be accomplished as a concerted unit while remaining installed in the carrier vehicle. Thus, the installation need not be disturbed unless maintenance is found to be required during the calibration process, which, in turn, results in the saving of considerable man-hours, vehicle-hours, and expense. Furthermore, the overall accuracy is measured, resulting in optimum performance of the entire sonar system.

Another desirable feature of the subject invention is that it may be used to effectively calibrate sonar systems as a unit in atmospheric air or in a simulated or actual service environment. Accordingly, for example, its use could be incorporated as part of the pre-flight inspection of a helicopter or as part of a pre-voyage inspection of a ship, submarine, missile or other carrier vehicle having a sonar system as part of its operational apparatus and would obviously facilitate ascertaining whether or not it was ready for any predetermined mission.

Another extremely desirable feature of this invention which ostensively constitutes an improvement over the prior art is that it may be used to calibrate both the transmission mode and the receiving mode of any given sonar system by merely switching from one to the other by means of a hand operated switch located on the calibrator and operating the sonar system accordingly.

It is, therefore, a primary object of this invention to provide an apparatus which will calibrate unitary sonar systems.

Another object of this invention is to provide a sonar calibration instrument which is self-contained, portable, and carries its own power supply.

A further object of this invention is to provide an echo-ranging calibration instrument which will measure the effectiveness of both the transmitting and receiving modes.

A still further object of this invention is to provide an apparatus for calibrating sonar equipment in an atmospheric environment.

Another object of this invention is to provide an apparatus for calibrating sonar equipment in a subaqueous environment.

A further object of this invention is to provide an instrument for determining the power output from an integrated sonar system.

Another object of this invention is to provide an instrument for determining the sensitivity of an integrated sonar system.

Another object of this invention is to provide a means which will facilitate determining the transmitted and received radiation pattern of an integrated sonar system.

A further object of this invention is to provide an instrument for calibrating echo-ranging equipment without removing same from its carrier vehicle.

Another object of this invention is to provide an instrument for determining the power output from and the receiving sensitivity of an integrated echo-ranging system.

Last but not least, it is an object of this invention to provide a sonar calibrator that is simple in structure and easily and economically manufactured.

Figure 2:
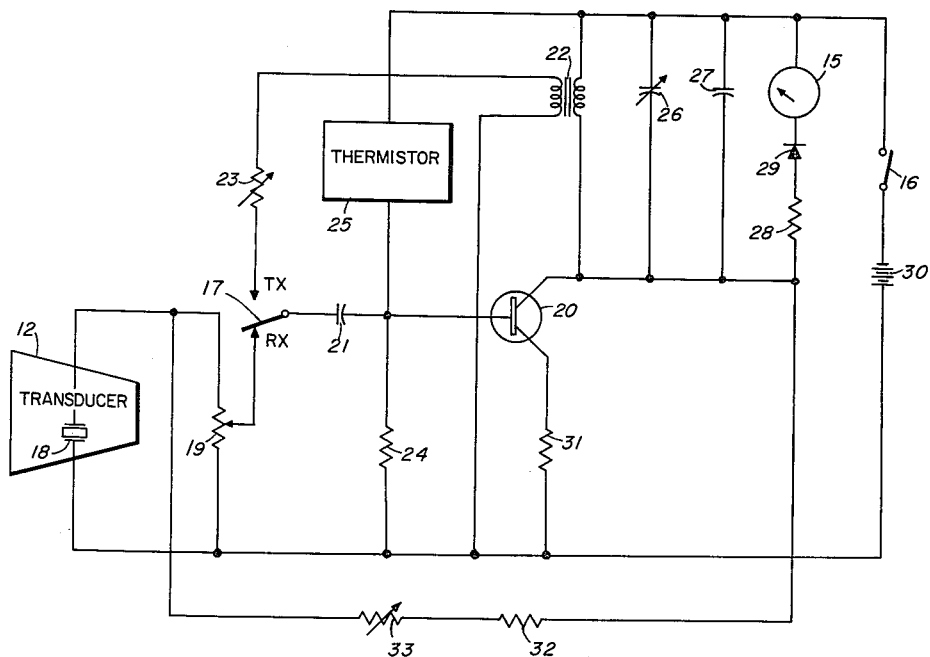

Other objects and many of the attendant advantages of this invention will be readily appreciated as the same becomes better understood by reference to the following detailed description when considered in conjunction with the accompanying drawing in which like reference numerals designate like parts throughout the figures thereof and wherein:

FIG. 1 depicts a perspective view of a preferred embodiment of the invention; and FIG. 2 is a schematic circuit diagram of a preferred embodiment of the invention.

Referring now to the drawing, there is shown in FIG. 1 a sonar transducer 10 having an energy projection face 11 in physical contact with the end of a transducer 12 of a sonar calibrator 13. A watertight case 14 is fixedly connected at one end to transducer 12 and may be of such size as to be held easily by hand. The other end of said case has an indicator 15, such as a 0–200 microampere meter, attached thereto in such manner that it may be easily read either underwater or in the atmosphere by anyone calibrating a sonar system in either of such environments. Accordingly, it should be understood that said indicator as well as the rest of the entire calibrator unit is of water tight construction. An on-off switch 16 is mounted on said case for convenient manual operation. Likewise a receive-transmit switch 17 of the single pole double throw type is also mounted on said case for manual operation thereof to facilitate conversion of the invention to a sonar system receiver calibrator and a sonar system transmitter calibrator as desired, as will be more fully explained subsequently. Although desirable but perhaps not absolutely essential, knurling has been included on that external portion of the case where the hand ordinarily holds the calibrator during a normal sonar system calibration in order to prevent hand slippage when the calibrator is held against the sonar transducer with sufficient force to have reasonably efficient transfer of energy therebetween. Even though the preferred embodiment discloses the invention to be an entire, self-contained, watertight unit, it should be understood that various components thereof could be separated from each other physically by merely extending the electrical connections therebetween by using appropriate extension cables, such as elongated coaxial cables, and encasing said components as individual watertight units. For example, transducer 12 could be such a separated unit. Or indicator 15 could be another. Obviously, separating these components would allow their being used at locations remote from one another and within different environmental mediums which, in turn, would enable the transducer to be operated underwater while the circuit and indicator portions of the instrument remained in dry dock or on board the carrier vehicle itself.

In addition, although it is disclosed that the transducer of the preferred embodiment is in physical contact with the face of the sonar transducer of the system being calibrated, such contact is not absolutely necessary if energy attenuation during transfer therebetween is taken into consideration and compensated for accordingly.

Enclosed within case 14 are the electronic components which cause the subject calibrator to function as intended. Referring now to FIG. 2, transducer 12 is shown as having an energy converter 18, such as an electrodynamic, piezoelectric generator of barium titanate material or the like, adapted to transmit and receive in a predetermined frequency range, such as 20 to 22 kc., electrically coupled in parallel with the fixed resistance terminals of a potentiometer 19. The slidable member of potentiometer 19 is connected to one pole of the aforesaid single pole double throw receive-transmit switch. The throw-member of said switch is connected to the input electrode or base of a transistor 20 of the PNP type or the like through a capacitor 21. The other pole of said switch is connected to one terminal of the secondary winding of a transformer 22 through a variable resistor 23, with the other terminal of said transformer secondary winding being connected to one terminal of transducer 12. Coupled between the input electrode or base of transistor 20 and said one terminal of transducer 12 is a resistor 24. A thermistor 25 is connected between the base of transistor 20 and one terminal of the secondary winding of transformer 22 for the purpose of compensating the entire calibrator circuit for temperature variations, thus providing greater accuracy. Although this thermistor is disposed as mentioned in the disclosed preferred embodiment, it is obvious that it may also be included elsewhere in the circuit for providing temperature compensation without violating the spirit and teachings of this invention. For example, a thermistor could be substituted for either or both resistors 23 and 24 if found convenient to do so. Of if temperature compensation is not desired, said thermistor could be deleted altogether and one or more ordinary resistors substituted therefor.

The collector electrode of transistor 20 is connected to one terminal of the primary winding of transformer 22, and connected in parallel with said primary winding of transformer 22 is a variable capacitor 26, a fixed capacitor 27, and series connected resistor 28, diode rectifier tube 29, and the aforementioned indicator 15. A power source such as a battery 30 is connected in series with the aforesaid on-off switch 16, and these combined elements interconnect the other terminal of said primary winding of said transformer 22 and said one terminal of said transducer 12 in such manner that the former is charged negatively while the latter is charged positively with respect thereto. A resistor 31 completes the circuit between the emitter electrode of transistor 20 and the positive pole of battery 30. And a fixed resistor 32 in series connection with a variable resistor 33 completes the circuit between the collector electrode of transistor 20 and the other terminal of transducer 12.

Briefly, the invention operates as follows. Considering first that the calibrator is acting as a receiver in order to determine the power output and perhaps the radiation pattern of any given sonar system installation, the receive-transmit switch 17 is positioned to close the movable arm and lower contacts as illustrated in FIG. 2. So doing thus activates the transducer-receiver-indicator portions of the invention for concerted performance. As the wave energy broadcast from the sonar system is received by transducer 12, the electrical output voltage therefrom is applied across the fixed resistance of potentiometer 19. A portion of this output voltage is then obtained from the said potentiometer and passed on through the receive-transmit switch and capacitance 21 to transistor 20 where it acts as a controlling parameter for proportionally regulating the current flow through said transistor. Said current flow is originally obtained from battery 30 from which it travels through closed on-off switch 16, indicator 15, diode 29, resistance 28 to the collector or transistor 20. The circuit is completed by connecting the emitter electrode to one of the transducer output terminals and to the positive side of battery 30 through resistor 31. It can, therefore, be seen that the amount of current flowing through the indicator is in direct proportion to the intensity of the wave energy received by the calibrator transducer. Inasmuch as thermistor 25 is effectively in parallel with that part of the receiver circuit containing series connected indicator 15, diode 29, and resistor 28, the amount of current passing therethrough is regulated, resulting in the compensation for varying ambient temperatures.

Considering now that the calibrator is acting as a transmitter in order to determine the sensitivity of the sonar system, receive-transmit switch 17 is positioned to close the movable arm and upper contact as depicted in FIG. 2 of the drawing. So doing deactivates the receiver as such and activates the transmitter portion of the invention. Again the negative terminal of battery 30 supplies the current which passes through indicator 15, diode 29, resistor 28, transistor 20 and back to the positive terminal of battery 30 through resistor 31 to complete the circuit. A tank circuit comprising capacitors 26 and 27 and the primary winding inductance of transformer 22 provide initial oscillation which is regenerated by positive feedback through the primary winding of transformer 22, variable resistance 23, receive-transmit switch 17, and capacitance 21 to the input base electrode of transistor 20, which timely kicks the oscillation cycle to keep it going. Of course, the frequency and amplitude of the oscillatory signal is determined by the inherent characteristics of the fixed components and the appropriate adjustment variable capacitor 26 and variable resistance 23. Again thermistor 25 being effectively connected in parallel with the indicator circuit causes the ambient temperature variations to be compensated to provide more accurate indicator readings. The output signals from the oscillator are applied from the collector electrode of transistor 20 and the negative terminal of battery 30 to the terminals of transducer 12 through resistors 32 and 33 which, in turn, cause wave energy to be generated thereby in proportion to power and frequency of said oscillator output signals. Since resistor 33 is of the variable type the power of the oscillator signals applied to the transducer may be regulated, thereby, in effect, regulating the power of the transmitted wave energy.

Although indicator 15 has been defined generally, it would be obvious that indication of received or transmitted wave energy power may be in any desired units in order to facilitate correlation between the sonar system being calibrated and the subject calibrator. For many practical purposes, however, it has been found that db units are quite satisfactory.

When the subject calibrator is not being used, on-off switch is set in the off position to disconnect the battery power source from the transmitter and receiver circuits for the purpose of conserving all elements concerned.

Such an arrangement as has been described above obviously permits the calibrator to be made in a relatively small, compact, and portable form which, in turn, pro-

What is claimed is:

1. A sonar calibrator comprising in combination a transducer means, said transducer means being capable of both transmitting acoustical wave energy within a predetermined frequency range upon excitation by an electrical input signal and producing an electrical output signal upon excitation by acoustical wave energy received within said predetermined frequency range, means coupled to said transducer means for controlling the magnitude of the electrical output signal therefrom during excitation by said wave energy, receiver means connected to said controlling means for response to said magnitude controlled electrical output signals, an oscillator means connected to said transducer means for generating the aforesaid electrical excitation input signal and applying same thereto, said receiver and oscillator means including a common transistor amplifier having a base, an emitter, and a collector appropriately connected therebetween for operating same as a component thereof, respectively, during reception of said magnitude controlled electrical output signal and generation of said electrical excitation input signal, an indicator means connected to said oscillator and receiving means for indicating the respective magnitudes of the aforesaid electrical excitation signal generated thereby and the controlled electrical signal received thereby, means connected to said oscillator means and said receiving means for compensating same for ambient temperature variations, means coupled to said amplifier, said oscillator means, and said receiving means for supplying electric power thereto, and selector means effectively interconnecting each of said last mentioned means and the aforesaid transducer means for selectively operating same as either a transmitting means or a receiving means as desired.

2. The device of claim 1 wherein said oscillator means for generating the wave energy transmitted by said transmitting and receiving means includes a transformer having a primary winding and a secondary winding, a resistance means, a capacitance means, said secondary winding being connected to the emitter of said amplifier through said resistance means and to the base of said amplifier through said selector means in series connection with said capacitance means and said primary winding being connected to the collector of said transistor amplifier and to the base of said transistor amplifier through the aforementioned ambient temperature compensating means, and a capacitor connected in parallel with said primary winding and the aforesaid indicator means, whereby signals are fed back to said transistor base from and in appropriate correlation with the potentials at said collector and emitter when said wave energy transmitting and receiving means is acting as a transmitter.

3. The invention according to claim 1 wherein said means coupled to said transducer means for controlling the magnitude of the electrical output signal therefrom during excitation by said wave energy includes a potentiometer having a fixed resistance connected in parallel with said transmitting and receiving means and a sliding pick-off effectively connected to the aforementioned amplifier.

4. An echo-ranging system calibrator comprising in combination, a transducer, said transducer being adapted to transmit and receive wave energy of a predetermined frequency range, an oscillator generator connected to said transducer adapted to generate signals within said predetermined frequency range, a receiver connected to said transducer adapted to receive signals within said predetermined frequency range, said oscillator generator and said receiver including a common transistor amplifier, means connected to said oscillator generator and said receiver for indicating the magnitude of the signals transmitted and received thereby respectively, means coupled to said oscillator generator, receiver, and common transistor amplifier for supplying electrical power thereto, a thermistor interconnecting the transistor amplifier common to said oscillator generator and receiver and said indicator means for temperature compensation thereof, thereby substantially eliminating indicating errors due to varying ambient temperatures, selector means coupled to said oscillator generator and said receiver for activating one and deactivating the other as desired, adjustable means interconnecting said transducer and said selector means for appropriately biasing said amplifier when said receiver is activated, and means coupled between said power supply means and the aforesaid indicating means for respectively energizing and deenergizing said oscillator generator and receiver means simultaneously.

5. The device of claim 4 wherein said transducer is a reversible electroacoustical energy wave projector.

6. The device of claim 4 wherein said transducer is a reversible electro-dynamic energy wave projector.

7. The device of claim 4 wherein said transducer is a reversible electro-magnetic projector.

8. The device of claim 4 wherein said common transistor amplifier is a PNP transistor.

9. The device of claim 4 wherein said common transistor amplifier is an NPN transistor.

10. The device of claim 4 wherein said means connected to said oscillator generator and said receiver for indicating the magnitude of signals transmitted and received thereby respectively includes a micro-ammeter having a db scale.

11. A sonar calibrator adapted to be operated within a subaqueous medium comprising in combination a case, a transducer mounted at one end of said case, said transducer being operationally reversible and adapted to transmit wave energy in proportion to input electrical signals received thereby and produce output electrical signals in proportion to wave energy received thereby, a meter for measuring and indicating the respective magnitude of said proportional input and output electrical signals disposed within the other end of said case, said meter, said transducer, and said case being of watertight construction, signal generator means coupled to said transducer for supplying said input electrical signals thereto, signal receiver means coupled to said transducer for receiving said output electrical signals produced thereby, said signal generator means and said signal receiver means being interconnected by a transistor amplifier common thereto, means connected to said generator means, said receiver means, and said transistor amplifier for supplying electrical power thereto, means coupled to said generator means, receiver means, and amplifier common thereto and said indicating meter for temperature compensation thereof, thereby substantially eliminating indicating errors due to varying ambient temperatures, means connected between said transducer and said generator and receiver means for selectively coupling said generator means to said transducer and said receiver means to said transducer as desired, means coupled to said transducer and said transistor amplifier for regulating the power transmission therebetween when said receiver is receiving said transducer produced output electrical signals, means included in said signal generator means for adjusting the frequency of the signals produced thereby within the aforesaid frequency range, and manually operable means disposed between said indicating meter and said electrical power supply for timely decoupling said power supply from the aforementioned signal generator and receiver means.

12. A sonar calibrator adapted for operation in both atmospheric and subaqueous environments comprising in combination, a hollow case, meter means mounted in one end of said case, an electroacoustical transducer mounted on the other end of said case, a receive-transmit switch mounted on and extending through said case, a power switch mounted on and extending through said case, said case, meter, transducer, receive-transmit switch, and power switch being of such construction as to provide a water-tight sonar calibrator unit, an electronic circuit mounted within said hollow case consisting of a potentiometer having a fixed resistance connected in parallel with the terminals of said transducer and a slide member coupled to one pole of said receive-transmit switch, a coupling capacitor connected to the throw member of said receive-transmit switch, a transistor having a base, an emitter, and a collector, the base of which is connected to said coupling capacitor, a first resistor interconnecting said base and one terminal of said transducer, a second resistor connected between said emitter and said one terminal of said transducer, a variable resistor having one terminal thereof connected to the other pole of said receive-transmit switch, a transformer having a primary winding and a secondary winding, said secondary winding being coupled between said one terminal of said transducer and the other terminal of said variable resistor, a thermistor connected to the base of said transistor, said primary winding being connected between the collector of said transistor and said thermistor, capacitance means shunting said primary winding, a network consisting of a third resistor, a diode, and the aforesaid meter means connected in series, said network being parallel connected with said primary winding and capacitance means, a power source, said power source being effectively coupled between said one terminal of said transducer and said primary winding through said power switch, and resistance means interconnecting the collector of said transistor and the other terminal of the aforesaid transducer.

References Cited in the file of this patent

UNITED STATES PATENTS

| | | |
|---|---|---|
| 2,011,299 | Polin | Aug. 13, 1935 |
| 2,333,688 | Shepard | Nov. 9, 1943 |
| 2,586,167 | Kamm | Feb. 19, 1952 |
| 2,654,003 | Dashiell | Sept. 29, 1953 |
| 2,757,243 | Thomas | July 31, 1956 |
| 2,757,475 | Pankove | Aug. 7, 1956 |
| 2,780,795 | Ambrosio | Feb. 5, 1957 |
| 2,918,651 | Podolak et al. | Dec. 22, 1959 |
| 2,935,565 | MacAdam et al. | May 3, 1960 |